April 23, 1957     W. HAMILTON     2,789,390
ANIMAL TRAP

Filed Feb. 4, 1953                        2 Sheets-Sheet 1

Inventor
WILLIAM HAMILTON
By
Attorney

April 23, 1957 W. HAMILTON 2,789,390
ANIMAL TRAP
Filed Feb. 4, 1953 2 Sheets-Sheet 2

Inventor
WILLIAM HAMILTON
By
Attorney

United States Patent Office 2,789,390
Patented Apr. 23, 1957

2,789,390

ANIMAL TRAP

William Hamilton, Vancouver, British Columbia, Canada

Application February 4, 1953, Serial No. 335,022

2 Claims. (Cl. 43—70)

This invention relates to improvements in an animal trap and appertains particularly to one for rodents and other small animals that automatically resets itself each time after an animal is caught.

An object of the invention is to provide a trap of novel design embodying a leaf-like platform having a combined teetering and hinging action that is initially released by longitudinal teetering and then swings downwardly on a side pintle to drop its load vertically into an underlying collector.

A further object of the invention is to provide a trap of the character described wherein the hinged platform has a counterbalance weight sufficient to return the emptied leaf-like platform to horizontal and self resetting position.

A further object of the invention is to provide a resetting mechanism wherein a spring member serves to cushion the reset.

A further object of the invention is to provide an automatically resetting animal trap of the nature and for the purpose described that is characterized by structural simplicity, durability, carefree efficiency and low cost of manfacture, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 1:
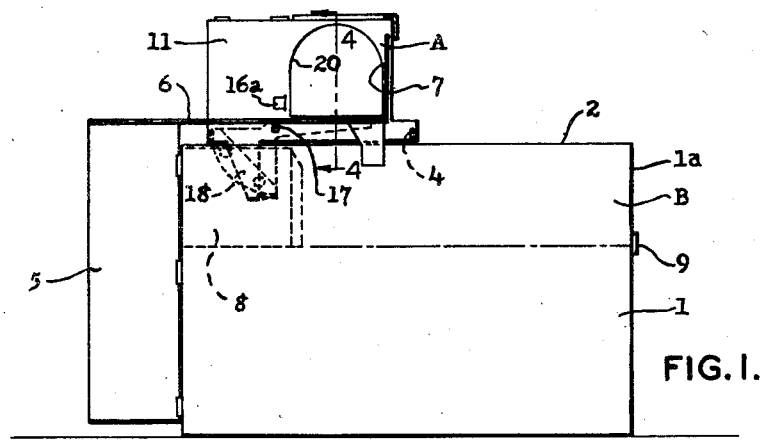
Figure 1 is a front elevation of a preferred embodiment of the invention, showing the trap housing mounted on a receiving tank.
Figure 2:
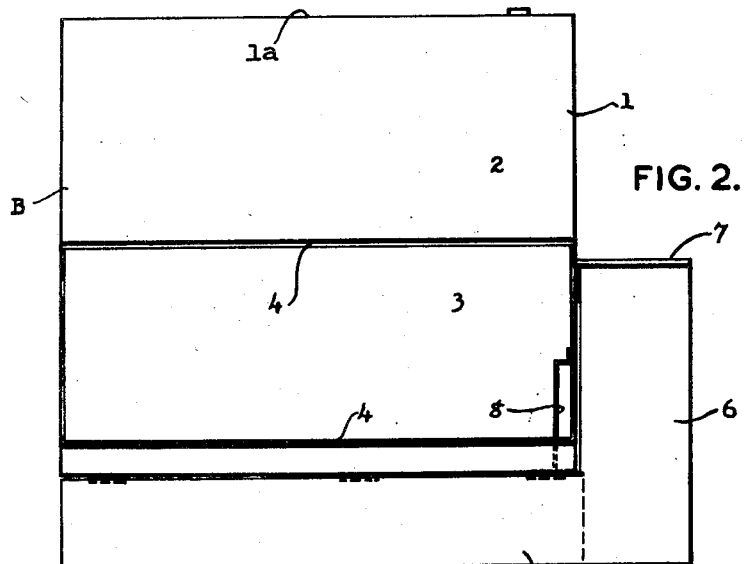
Figure 2 is a plan view of the tank with the trap removed.
Figure 6:
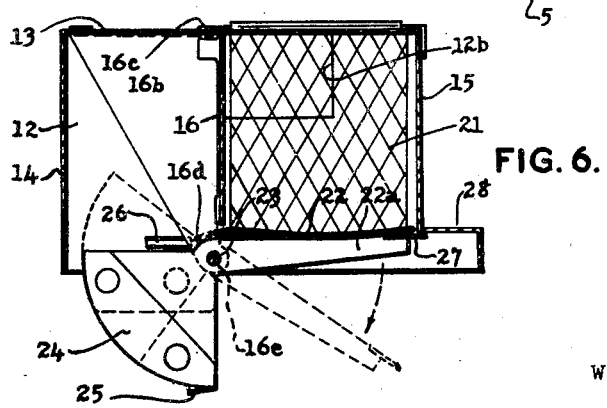
Figure 6 is a transverse vertical section of the trap, as taken on line 6—6 of Figure 5.
Figure 3:
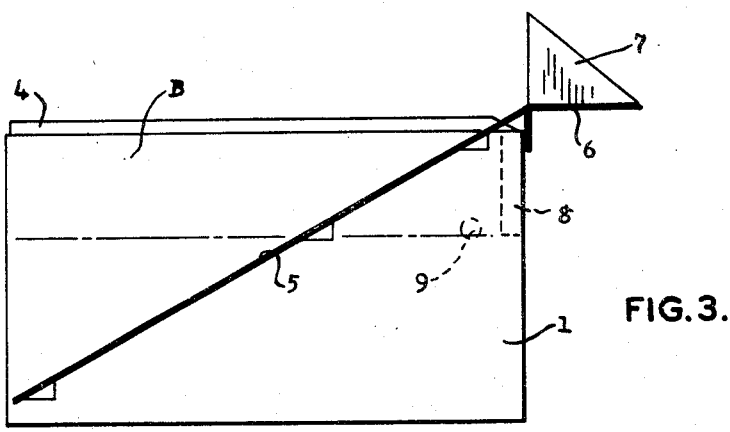
Figure 3 is a side elevation of Figure 2.
Figure 4:
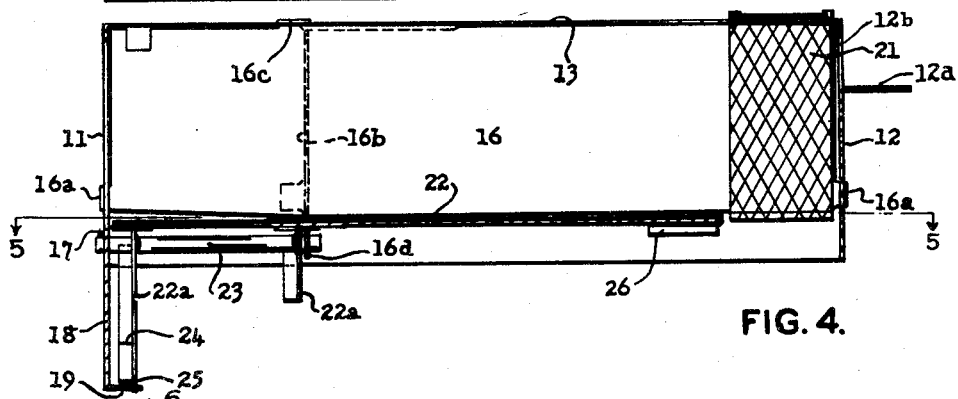
Figure 4 is an enlarged longitudinal vertical section of the trap portion, as taken on line 4—4 of Figure 1.
Figure 5:
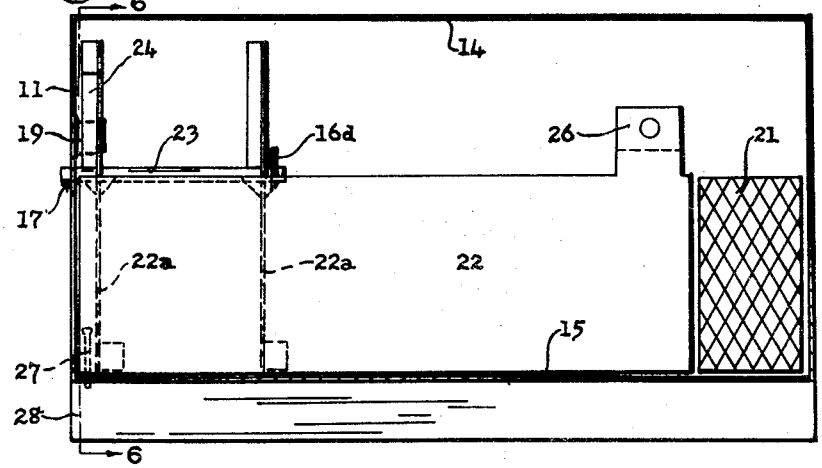
Figure 5 is a longitudinal horizontal section of the trap, as taken on line 5—5 of Figure 4.

The device may be conveniently regarded as consisting of two main parts, a trap box A and a receiving compartment B, here shown as a water tank, over which the trap box A is mounted.

Specifically the tank B has a rectangular body 1, one longitudinal half of the top of which has a cover 2 and the other half is open as at 3; both longitudinal sides of the opening having a projecting rim 4 over which the trap box A is set and held against accidental horizontal displacement. A lead-up ramp 5 runs up one side of the tank with a ledge 6 continuing therefrom across the adjacent end of the open half 3 of the top of the tank, which ledge terminates in an upstanding wall or barrier 7. An open topped encloseure 8 descends into the tank at this ledge-served end for a purpose to be later described. To maintain a constant water level, a conventional overflow pipe 9 is inserted in the side wall 1a of the tank.

The box or trapping unit A that surmounts this receiving member or tank B is of extremely simple design, with only one moving member and no complicated mechanisms to get out of order. It consists essentially of a rectangular open bottomed box A that completely covers the open half 3 of the tank B, straddling the spaced parallel side rims 4. The box includes a front 11, back 12, top 13 and opposite sides 14 and 15. A flap 12a is struck out of the upper portion of the back 12 to provide a ventilating opening 12b and this flap also serves as a handle lift when removing the box. A vertical partition 16 divides the box longitudinally, having lugs 16a projecting through the front and back of the box and provided also with an integral reinforcing wing 16b bent at right angles and with lugs 16c securing it to the box top 13. The wing of this partition that may be regarded as a part of the trap box has a depending projection 16d with a perforation 16e therethrough disposed in a plane normal to the longitudinal axis of the box. Additionally it is to be noted that the front 11 of the box has an aperture 17 that is horizontally and vertically aligned with the perforation 16e though spaced a considerable distance from it and furthermore the aperture 17 is vertically elongated. The front 11 also has a depending arm 18 with a terminal inturned flange 19.

The bottom of the trap box A is open overlying the open top portion of the tank B. On one side of the partition 16, the front 11 has a door opening 20 and near the back, on the same side of the partition a bait cage 21 is inserted through the roof 13. Between the door opening 20, that leads in off the ledge 6, and the bait cage 21, a horizontal platform 22 extends. The platform has a spaced pair of integral reinforcing spiders 22a disposed transversely and underlying it near its forward end. These spaced spiders are perforated to pass a hinge pin or rock shaft 23, friction held or brazed therein, whose opposite ends are journalled in the perforation 16e and the vertically elongated slot 17 in the front of the trap box. The spiders 22a project laterally from the platform extending under the partition 16 and the foremost of the spiders has a counterbalance weight 24 on its laterally projecting part and also a small projecting shoulder 25 on the outer side of its lower edge that normally engages the inturned flange 19 of the box front depending arm 18 thereby holding the hinged platform in raised or horizontal position. The greater length (approximately two-thirds) of the platform 22 overhangs or extends in beyond the inner end of the hinge pin 23 where it is supported in the partition wing projection journal 16d and this long overhang of the platform is sensitively balanced against the counterbalance-weighted forward end by a weight 26 integral with the platform near its inner end and extending laterally from the hinged edge of the platform to underlie the partition. This weight 26 and the long overhang of the platform is just less than enough to overcome the forward counterbalance weight that holds the forward end of the platform down with the forward end of the hinge pin 23 resting on the bottom of the box front perforation 17 and the dog or shoulder 25 in locking engagement with the keeper flange 19. Only a very slight weight is needed on the rear of the platform to teeter it on the rear hinge pin support to cause disengagement of the projection 25 and keeper 19 followed by the immediate downward hinging of the platform to drop its load into the tank receptor beneath.

Once freed of its load, the counterbalance weight 24 will swing the hinged platform 22 back to its horizontal position and in doing so the projection 25 rides over the keeper 19 and drops past it into reset and locked position. To cushion the impact of the return swing, a leaf spring 27 mounted on the underside of the platform and projecting outwardly beyond the edge thereof engages the side of the trap box, or specifically in the illustrated form, the underside of a projecting shoulder 28 running along the lower edge of side 15. To prevent possible interference with the resetting swing of the counterbalance 24, its operating field is protectively fenced by the enclosure 8 on the wall of the tank.

Briefly then, this automatically resetting trap consists of a receiving unit that may be a cage or the like but is here shown as a water tank and a superposed trap box which latter is but a baited, open door, walk-in housing with a single movable part, the merit of the device resulting largely from the form and suspending of the platform that is hinged to swing downwardly but hingedly connected only at its forward end and balanced to teeter longitudinally when the animal loads the inner end of the platform and on teetering to clear engagement with the holding means so that the loaded door swings downward to drop its victim into the receiver.

From the foregoing description taken in connection with the accompanying drawings, it will be manifest that an animal trap is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. A resetting animal trap, for use with a suitable receiving unit, comprising an open-bottom, box-like housing having a front, back, top and opposite sides, said front side having a door opening therein to one side thereof and a bait holder at the back end, a longitudinally extending vertical partition dividing said housing and having a wing portion on one side thereof, a horizontal platform on the side of said partition opposite said wing and extending longitudinally between said door opening and said bait holder, a hinge pin disposed below and laterally offset from one edge of said platform and for only the front portion thereof, said pin being journalled at opposite ends in perforations in the front of said housing and said wing respectively, the perforation in the housing front being elongated vertically, and said platform being free to hinge on the axis of said pin and to teeter longitudinally on said wing, a weight to counterbalance both the hinging and longitudinal teetering of said platform connected with the front end of said platform and projecting laterally beyond said hinge pin and locking means connecting the platform and housing that is released by the teetering of said platform, said locking means comprising an arm depending from the front of said housing having a terminal inturned flange and a projecting shoulder on the outer side of the lower edge of said weight normally engaging said flange.

2. A resetting animal trap, for use with a suitable receiving unit, comprising an open-bottom, box-like housing having a front, back, top and opposite sides, said front having a door opening formed therein to one side thereof and a bait holder at the back end; a longitudinally extending vertical partition dividing said housing and having a wing portion on one side thereof; a horizontal platform on the side of said partition opposite said wing, and extending longitudinally between said door opening and said bait holder; a hinge pin for said platform disposed below and laterally offset from one edge of said platform and for only the front portion thereof, said pin being journalled at opposite ends in perforations in the front of said housing and said wings respectively, the perforation in the housing front being elongated vertically, and said platform being free to hinge on the axis of said pin and to teeter longitudinally on said wing; said platform consisting of a single piece of sheet metal and including a longitudinally spaced pair of underlying transversely disposed spiders near its forward end that are traversed by and secured to said hinge pin, said spiders projecting laterally from the platform and extending under said partition, and the frontmost of said spiders carrying a counter-balancing weight operating against both the hinging and teetering of the platform; and a catch on said foremost of said spiders normally engaging a fixed part of said housing for holding said platform in normal horizontal position said catch being released from said housing part on the longitudinal teetering of said platform, as when an animal loads the inner end thereof.

References Cited in the file of this patent

UNITED STATES PATENTS

| | | |
|---|---|---|
| 463,011 | Thiellesen | Nov. 10, 1891 |
| 1,161,089 | Waldo | Nov. 23, 1915 |
| 1,400,175 | McCurrie | Dec. 13, 1921 |
| 1,668,726 | Mueller | May 8, 1928 |
| 2,333,651 | Holzknecht | Nov. 9, 1943 |
| 2,424,362 | Meyer | July 22, 1947 |